United States Patent Office 3,321,521
Patented May 23, 1967

3,321,521
REGENERATION OF CHELATING SOLUTIONS
George T. Kerr, Lawrence Township, Mercer County, N.J., assignor to Mobil Oil Corporation, a corporation of New York
No Drawing. Filed Dec. 6, 1963, Ser. No. 328,496
6 Claims. (Cl. 260—567.6)

This invention relates to the regeneration of chelating solutions and, more particularly, to a process for regenerating chelating solutions having particular utility in the production of crystalline aluminosilicates having high silica/alumina ratios.

In copending application Ser. No. 261,494, filed Feb. 27, 1963 and now abandoned, is described a novel process for modifying the silica/alumina ratio in crystalline aluminosilicates. One of the inventive concepts disclosed in said copending application involves the selective removal of aluminum from crystalline aluminosilicates by means of a combined solvolysis-chelation technique which involves the use of molecules or ions which can complex strongly with trivalent aluminum to form aluminum complexes which may be readily removed from the aluminum-deficient aluminosilicate.

Included in the various examples of complexing agents which are described as usable in the process of said copending application are ethylene-diaminetetraacetic acid (referred to hereinafter in this specification and claims as "$H_4$EDTA," the ethylenediaminetetraacetate ion being referred to hereinafter as "EDTA") and various substituted $H_4$EDTA compounds. While such complexing agents and, in particular, di(tetraethylammonium) dihydrogen EDTA, are particularly effective complexing agents for use in the process described in said copending application, however, it is relatively expensive to conduct the process with such complexing agents. Accordingly, it would be extremely desirable to devise a technique which would permit the regeneration either of the complexing agents or of the component materials used to form such complexing agents for reuse in the chelation stage of the process disclosed in said copending application.

In accordance with the instant application, it has been discovered that a practical regeneration process permitting such regeneration is indeed possible and that such process is useful for the regeneration not only of such materials but of other materials which are broadly related thereto.

It is accordingly a primary object of the present invention to provide a novel technique for regenerating spent chelating solutions.

It is another important object of the present invention to provide a novel technique for regenerating spent EDTA solutions.

It is a further important object of the present invention to provide a novel technique for recovering, by means of a novel regeneration technique, a desired cation in the form of its water-soluble, non-volatile base from a solution containing (1) such cation, (2) the anion of a water-insoluble acid capable of chelating aluminum and the cation of a crystalline aluminosilicate, and (3) chelates containing said anion and aluminum and said last-mentioned cation.

It is still a further important object of the present invention to provide a novel process for the recovery of quaternary ammonium hydroxide and $H_4$EDTA from di(quaternary ammonium) dihydrogen EDTA which has previously been used to chelate calcium and aluminum ions from a crystalline aluminosilicate.

It is another object of the present invention to provide a novel method for separating $H_4$EDTA from a solution containing dihydrogen EDTA ions and calcium EDTA ions comprising acidifying said solution to a pH of about 2 or less and removing precipitated $H_4$EDTA from the solution.

These and other important objects and advantages of the present invention will become more apparent upon reference to the ensuing description and appended claims.

The present invention may best be initially described by reference to a typical application of the process involving the regeneration of the spent solution resulting from the chelation of a calcium crystalline aluminosilicate with di(tetraethyl-ammonium) dihydrogen EDTA. The spent solution which is to be regenerated contains free quaternary ammonium ions (the tetraethyl-ammonium ion), dihydrogen EDTA ions, hydrogen ions, calcium EDTA ions and aluminum EDTA ions. A sufficient quantity of an acid is mixed in with said solution to adjust the pH of the solution sufficiently to precipitate $H_4$EDTA from the solution. The $H_4$EDTA is then suitably removed by filtration, the filtrate containing aluminum ions, calcium ions, quaternary ammonium ions and anions of the acid. Addition of excess ammonium hydroxide to this filtrate will then cause aluminum hydroxide and calcium hydroxide and/or the calcium salt of the acid to precipitate from the solution. Filtration of this mixture will yield a filtrate containing ammonium and quaternary ammonium salts of the acid in solution. This solution is then treated with a basic additive whose cation will form an insoluble compound with the anion of the previously used acidic additive and, upon filtration, a filtrate containing ammonium and quaternary ammonium hydroxides will result. The ammonium hydroxide may then be decomposed by heating the filtrate to form ammonia gas (which is removed from the solution by the heating operation) and water, to yield a solution of relatively pure quaternary ammonium hydroxide. (See Example 1 for an illustration of this procedure.)

The acidic additive utilized in the first step to form the insoluble $H_4$EDTA may suitably be concentrated sulfuric acid, in which case the basic additive used in the next-to-the-last step should have a cation whose sulfate is water-insoluble, such as barium hydroxide. Alternatively, the acidic additive could be an acid such as HBr or HI, in which case the basic additive would be a compound such as silver oxide. Any of the three acids in question could be used, on the other hand, where the basic additive is a material such as a strongly basic anion exchange resin. A typical example of such a resin is the material marketed under the name "Amberlite IRA–400," which is comprised of a polystyrene divinyl benzene matrix with a trimethylamino group attached to the benzene ring.

The basic material used to neutralize the acid solution following the acidic additive need not necessarily be ammonium hydroxide, though ammonium hydroxide is a relatively inexpensive base for the neutralization step. In lieu of ammonium hydroxide, any nucleophilic substance of high volatility (i.e., a substance which boils at about 30° C. or less) may be utilized for the purpose. Thus, ammonia gas may be directly added to the filtrate resulting following the removal of the precipitated acid or, as another example, any highly volatile alkyl-substituted amine may be utilized.

It should also be noted that the nucleophilic additive could, if desired, be eliminated completely with the final basic additive (in the above discusion, the barium hydroxide) being utilized not only for the purpose of precipitating the aluminum and calcium but to form a precipitate which includes the anion of the acidic additive. Thus, if sufficient barium hydroxide were added in the typical example set forth above, the ammonium hydroxide additive could have been eliminated and the precipitate of the second step would include not only aluminum hydroxide and calcium hydroxide (and/or sulfate) but insoluble barium sulfate, as well. Example 2 illustrates such a technique. This procedure, while saving a step in the process, is not necessarily to be preferred to the sequence utilizing ammonium hydroxide since the latter is less expensive than barium hydroxide and does result in some economy in the overall process.

The process of the present invention is, furthermore, not restricted to the regeneration of the specific solution described above. On the contrary, the present process is broadly applicable to the regeneration of any solution containing a cation which, in its basic form, is water soluble and non-volatile, the anion of a water-insoluble acid capable of chelating aluminum and a cation carried by a crystalline aluminosilicate, and chelates of said anion with aluminum and said last-mentioned cation. In each case, the process will involve the initial precipitation of the water-insoluble acid through preliminary acidification with an acidic additive, the removal of insoluble compounds of aluminum, of the cation of the aluminosilicate and of the anion portion of said acidic additive by means of one or more basic additives and, in the case where one of the basic additives is a nucleophilic substance of high volatility, a final heating step to isolate the desired water soluble, involatile base. (Where such a nucleophilic material is not employed, the final heating step may be dispensed with unless it is desired to concentrate the final solution.) As examples of other cations which may be contained by the aluminosilicate are silver, copper, cerium, or any other cation which will form a stable, water-soluble chelate with the chelating agent utilized.

The extent of the preliminary acidification resulting in the removal of the water-insoluble acid component will necessarily vary depending upon the acid to be precipitated, but in general should result in a pH of approximately 2 or less. Where ammonium hydroxide is utilized for the neutralization of the acid solution, sufficient ammonium hydroxide should be added to neutralize completely the acidic solution and until no further precipitate forms. In such case, the finally added basic component should be added in sufficient quantity until no further precipitate (in this case, that containing the anion of the acidic additive) forms. Where a single basic additive is used, a sufficient quantity of such additive should be used to precipitate not only the aluminum and aluminosilicate cation components but the acidic additive anion component, as well. Finally, where it is necessary to remove volatiles formed by the addition of a nucleophilic substance from the final solution, the solution should be heated at a temperature between about 30–100° C. depending upon the pressure, a suitable treatment involving heating at about 70° C. at a pressure of approximately 100 mm. of Hg.

Following are examples of the regeneration process of the present invention:

*Example 1*

The solution obtained from a reaction used to remove calcium and aluminum from a calcium zeolite Y was used in the example. This solution originally was prepared from 52.6 g. (0.18 mole) of ethylenediaminetetraacetic acid and 0.36 equivalent of tetraethylammonium hydroxide solution. To the spent solution was added 25 ml. of concentrated sulfuric acid to give a final pH of 1. The mixture was chilled to 5–10° C. and filtered. The solid product was rinsed with 100 ml. of ice water. After air-drying, the crystalline product weighed 43.2 g. On the basis of the neutral equivalent of this material as an acid, as determined by titration, the crystalline product was found to be approximately 99% pure compared with a sample of authentic ethylenediaminetetraacetic acid.

The filtrate obtained from the acid recovery was evaporated to a somewhat lower volume and with boiling was made basic with excess ammonium hydroxide to yield a voluminous precipitate. After standing for several hours the gelatinous precipitate was filtered and the filtrate was heated with 187 g. (0.6 mole) of barium hydroxide octahydrate for 2 to 3 hours. This mixture was filtered and evaporated to a volume of about 125 ml. Upon chilling the solution, barium hydroxide crystallized from the mixture and was removed by filtration. The filtrate, 120 ml., was found by titration to be 1.95 N solution as a base. The recoveries of the ethylenediaminetetraacetic acid and the tetraethylammonium hydroxide were 77% and 65%, respectively.

*Example 2*

A spent solution, initially prepared from 66 g. (0.225 mole) of ethylenediaminetetraacetic acid and .525 equivalent of tetraethylammonium hydroxide, was made acidic to pH 1 by adding about 45 ml. of concentrated sulfuric acid. After chilling the mixture, the crystalline ethylenediaminetetraacetic acid was collected on a funnel and washed with 200 ml. of ice water. The air-dried acid was found, by the method described in Example 1, to be about 94% pure and weighed 65.2 g. The acid was further purified by first dissolving in ammonium hydroxide solution and then precipitating by the addition of excess sulfuric acid. The recovered acid then weighed 62 g. and was 97% pure compared with an authenic sample of ethylenediaminetetraacetic acid.

The filtrate originally obtained from the acid recovery filtration was heated on a steam bath for 3 hours with 285 g. (0.9 mole) of barium hydroxide octahydrate. The mixture was filtered free of barium sulfate after chilling to yield 130 ml. of 1.97 N tetraethylammonium hydroxide solution. The recoveries of ethylenediaminetetraacetic acid and tetraethylammonium hydroxide were 95% and 48%, respectively.

These recovered materials from both examples, the acid and the base, were used in place of fresh reagents for the removal of calcium and aluminum from a calcium zeolite Y as previously described. The reaction yielded a product identical to that obtained from fresh reagents.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A method of obtaining an aqueous solution of $NR_4OH$ from an aqueous solution containing $NR_4^+$, $H^+$, $H_2EDTA^=$, $CaEDTA^=$ and $AlEDTA^-$, wherein $NR_4^+$ is a tetraethylammonium ion and wherein said EDTA represents the ethylenediaminetetraacetate ion, comprising:
   (a) adjusting the solution to a sufficiently low pH with an acidic additive to induce $H_4EDTA$ to precipitate; and
   (b) adjusting the pH of the remaining solution so that it is sufficiently basic to form insoluble compounds containing aluminum and calcium, said pH being adjusted with at least one base whose cation will form with the anion of said acidic additive an insoluble compound which will precipitate in the solution.

2. A method as defined in claim 1 wherein step (b) is carried out in two stages, the first stage involving the addition of a sufficient quantity of a nucleophilic substance of high volatility to form a precipitate containing compounds of aluminum and calcium, the second stage involving the addition to the solution resulting from the first stage of a base whose cation will form with the anion of said acid an insoluble compound which will precipitate from the solution.

3. A method as defined in claim 2 wherein the solution resulting from said second stage is heated sufficiently to expel any volatile material formed by said nucleophilic substance.

4. A method as defined in claim 3 wherein said nucleophilic substance is $NH_4OH$.

5. A method as defined in claim 2 wherein said acidic additive is selected from the group consisting of HBr, HI and $H_2SO_4$, the base added in the second stage being selected from the group consisting of $Ag_2O$ and a highly basic anion exchange resin, said base being $Ag_2O$ when said acid is HBr and HI.

6. A method of obtaining an aqueous solution of $NR_4OH$ from an aqueous solution containing $NR_4^+$, $H^+$, $H_2EDTA^=$, YEDTA ion and $AlEDTA^-$, wherein $NR_4^+$ is a tetraethylammonium ion, and Y is a cation, said EDTA representing the ethylenediaminetetraacetate radical, comprising: (a) adjusting the solution to a sufficiently low pH with an acid to induce $H_4EDTA$ to precipitate; and (b) adjusting the pH of the remaining solution so that it is sufficiently basic to form insoluble compounds containing aluminum and cation Y, said pH being adjusted with at least one base whose cation will form with the anion of said acid an insoluble compound which will precipitate in the solution.

References Cited by the Examiner

UNITED STATES PATENTS

| 2,466,050 | 4/1949 | Shabaker | 260—120 |
| 2,971,904 | 2/1961 | Gladrow | 208—135 |
| 3,033,214 | 5/1962 | Bersworth | 260—534 X |
| 3,151,058 | 9/1964 | Erickson | 252—455 |

LORRAINE A. WEINBERGER, *Primary Examiner.*

ALBERT P. HALLUIN, D. P. CLARKE,

*Assistant Examiners.*